(12) United States Patent
Lin et al.

(10) Patent No.: US 12,131,519 B2
(45) Date of Patent: Oct. 29, 2024

(54) METHOD AND SYSTEM FOR POLLUTANT IDENTIFYING AND EARLY WARNING BASED ON CLUSTER ANALYSIS

(71) Applicant: Changjiang River Scientific Research Institute, Hubei (CN)

(72) Inventors: Li Lin, Hubei (CN); Kefeng Zhao, Hubei (CN); Liangyuan Zhao, Hubei (CN); Jian Tang, Hubei (CN); Pingan Luo, Hubei (CN); Zheng Jing, Hubei (CN); Huiqun Cao, Hubei (CN); Zhenhua Wang, Hubei (CN); Huan Li, Hubei (CN); Haiyang Jin, Hubei (CN); Xiong Pan, Hubei (CN); Xiaohuan Cao, Hubei (CN)

(73) Assignee: Changjiang River Scientific Research Institute, Hubei (CN)

( * ) Notice: Subject to any disclaimer, the term of this patent is extended or adjusted under 35 U.S.C. 154(b) by 348 days.

(21) Appl. No.: 17/745,638

(22) Filed: May 16, 2022

(65) Prior Publication Data

US 2022/0277546 A1     Sep. 1, 2022

(30) Foreign Application Priority Data

Jan. 11, 2022  (CN) .......................... 202210026702.1

(51) Int. Cl.
| | | |
|---|---|---|
| *G06V 10/762* | (2022.01) | |
| *G06T 11/40* | (2006.01) | |
| *G06T 15/00* | (2011.01) | |
| *G06V 10/56* | (2022.01) | |
| *H04N 7/015* | (2006.01) | |
| *H04N 7/18* | (2006.01) | |

(52) U.S. Cl.
CPC ............ *G06V 10/762* (2022.01); *G06T 11/40* (2013.01); *G06T 15/00* (2013.01); *G06V 10/56* (2022.01); *H04N 7/015* (2013.01); *H04N 7/183* (2013.01); *G06T 2210/32* (2013.01)

(58) Field of Classification Search
None
See application file for complete search history.

(56) References Cited

U.S. PATENT DOCUMENTS

2018/0206475 A1 * 7/2018 Carter ...................... B64D 1/18
2018/0330027 A1 * 11/2018 Sen .......................... B08B 13/00
(Continued)

*Primary Examiner* — Daniel T Tekle
(74) *Attorney, Agent, or Firm* — Lei Yu

(57) ABSTRACT

A method and a system for pollutant identifying and early warning based on cluster analysis include steps of: installing multiple high-definition cameras on a river or a sluice dam, capturing pollutant images in front of the sluice dam at certain intervals, and transmitting the pollutant images captured by the high-definition cameras to a computer; reading the pollutant images transmitted to the computer; extracting a main pollutant color in the pollutant images through cluster analysis; calculating a difference between the main pollutant color and RGB data in a pollutant color gamut database, and setting an aberration threshold to identify the pollutant color; performing scale conversion with two sets of common point image pixel coordinates and actual plane coordinates to calculate a current pollutant area; and judging whether a polluted area exceeds a critical value according to a preset pollutant area threshold, thereby realizing early warning.

8 Claims, 3 Drawing Sheets

(56) References Cited

U.S. PATENT DOCUMENTS

| | | | | |
|---|---|---|---|---|
| 2019/0195883 A1* | 6/2019 | Chan | .................. | C12Q 1/701 |
| 2019/0204123 A1* | 7/2019 | Zhao | .................. | G01S 17/06 |
| 2021/0224512 A1* | 7/2021 | Zhai | .................. | G06V 10/56 |

* cited by examiner

METHOD AND SYSTEM FOR POLLUTANT IDENTIFYING AND EARLY WARNING BASED ON CLUSTER ANALYSIS

CROSS REFERENCE OF RELATED APPLICATION

The present invention claims priority under 35 U.S.C. 119(a-d) to CN 2022100267021, filed Jan. 11, 2022.

BACKGROUND OF THE PRESENT INVENTION

Field of Invention

The present invention relates to a technical field of image recognition and environmental protection, and more particularly to a method and a system for pollutant identifying and early warning based on cluster analysis, which is capable of pollutant identifying and early warning without supervision.

Description of Related Arts

To fully implement the river chief system, the main tasks are to protect water resources, prevent water pollution, improve the water environment, and restore the water ecology. To fulfill the objects of the river chief system, river chiefs at all levels have increased river inspection efforts, thereby protecting the ecological environment of rivers. In order to grasp the situation of river water quality, water cleaning, greening maintenance, illegal sewage discharge, and guardrail protection, grass-roots water conservancy, environment and other departments have invested a lot of manpower and material resources to carry out river inspections. Conventionally, river inspections mainly rely on manual on-site inspections and drone inspections, wherein video system monitoring is often used for key river sections requiring long-term monitoring. Manual and drone inspections cannot last long, cost much, and can only qualitatively judge the pollution of the river. The monitoring system needs to be stationed manually for a long time, and cannot quantitatively judge the pollution of the river. Conventional river inspection and monitoring methods have low degree of informatization, low degree of automation, and high cost of human and material resources, which cannot meet the needs of long-term, quantitative monitoring and early warning. Therefore, it is urgent to find a monitoring and early warning method which is real-time online, fully automatic, high in precision, capable of quantitative analysis and calculation, and low in labor and material cost.

The proposal of the pollutant identifying and early warning system has solved the problems in conventional manual and drone inspections and river monitoring. Due to its characteristics of real-time online, quantitative analysis, and unattended operation, such system has received more and more attention. However, there are few related technical methods. Chinese patent CN211825990U disclosed an early warning system for urban river pollutants, which can qualitatively and quantitatively judge the surface coverage degree of garbage in river and the degree of water pollution by shooting river garbage images and acquiring water quality monitoring sensor data, wherein monitoring and early warning are carried out by comparing with the standard values. Chinese patent CN109613559A disclosed a device and method for discriminating floating objects on the boundary of water and land based on vision and lidar, which includes a data acquisition layer, a processing discrimination layer and a communication interface layer, wherein a device and a method for detecting the boundary between water surface floating objects and land allow the unmanned ship to accurately determine the boundary between the water surface with floating objects and the land or river bank.

Most of the conventional identifying and early warning methods are based on the subjective judgment of images without data quantification, which cannot provide real-time quantitatively monitoring and early warning.

SUMMARY OF THE PRESENT INVENTION

In view of the above-mentioned deficiencies in the prior art, an object of the present invention is to provide a method and a system for pollutant identifying and early warning based on cluster analysis. A high-definition camera is installed in a river way or in front of a sluice dam to capture pollutant images, and then a K-means cluster analysis method is combined with pollutant color gamut to perform image recognition and pollutant area calculation. Finally, pollutant early warning is carried out according to a preset pollutant area threshold, which is real-time online, fully automatic, unattended, and quantitative, so as to solve the problem of unsupervised early warning of pollutants.

Accordingly, in order to accomplish the above objects, the present invention provides:

a method for pollutant identifying and early warning based on cluster analysis, comprising steps of:

1) performing pollutant image acquisition by: installing multiple high-definition cameras on a river or a sluice dam, capturing pollutant images in front of the sluice dam at certain intervals, and transmitting the pollutant images captured by the high-definition cameras to a computer;

2) performing image processing and cluster analysis by: reading image data by the computer, and converting the pollutant images from raster data to three-dimensional RGB data; then converting the three-dimensional RGB data into two-dimensional image data in a form of row first and then column; determining k cluster centers according to a K-means analysis principle, and converting the two-dimensional image data into k cluster RGB data through iterative calculation;

3) performing pollutant identification by: extracting main pollutant RGB values in the pollutant images, so as to form a pollutant color gamut database; calculating a difference between the k cluster RGB data and RGB data in the pollutant color gamut database, and setting an aberration threshold to identify pollutant clusters in k clusters; and 4) performing pollution area calculation and early warning by: determining a pixel quantity of the pollutant clusters according to K-means cluster analysis data identifiers, and calculating a pollutant pixel area; then calculating horizontal and vertical ratios between an actual plane coordinate system and an image pixel coordinate system through two sets of common point image pixel coordinates and actual plane coordinates; obtaining an actual pollutant area by a product of the pollutant pixel area and the horizontal and vertical ratios; and judging whether a polluted area exceeds a critical value according to a preset area threshold.

Preferably, the method further comprises a step of:

5) performing result display and data export, wherein the result display comprises image display and data display; the image display provides original images captured by the high-definition cameras, processed images, and k cluster center display images; the data display provides RGB values of the k cluster centers, area proportions of the k clusters, pixel areas of the k clusters, and plane areas of the k clusters; data export outputs events involved in the data display.

Preferably, the step 1) comprises specific steps of:

1.1) performing image capture by: setting the high-definition cameras on the river or the sluice dam, and automatically capturing the pollutant images in front of the sluice dam at the certain intervals; and 1.2) performing image transmission and storage: transmitting the pollutant images to an indoor computer through a wireless transmission module, and storing in a designated folder.

Preferably, the step 2) comprises specific steps of:

2.1) performing three-dimensional image data acquisition by: reading a recent image to obtain three-dimensional image data thereof in a form of M×N×3, wherein the form of M×N×3 refers to RGB triads with M rows and N columns;

2.2) performing two-dimensional image data conversion by: rearranging the three-dimensional image data to convert the three-dimensional image data into the two-dimensional image data in a form of MN×3 in an order from left to right and from top to bottom, wherein the form of MN×3 refers to MN rows and 3 columns; MN represents a product of M and N, 3 columns represent RGB triads;

2.3) performing cluster calculation by: dividing the two-dimensional image data into k groups, and randomly selecting k objects as initial cluster centers; calculating distances between each object and each cluster center, and assigning each object to a nearest cluster center according to a distance calculation result, thereby forming the k clusters and completing one cluster calculation; and 2.4) performing cluster iteration by: continuously updating the cluster centers through the cluster calculation; iterating by repeating the step 2.3) until the cluster centers no longer change, thereby completing the cluster iteration and determining the k clusters as well as the k cluster centers; and numbering RGB values of the clusters and the cluster centers for identification.

Preferably, the step 3) comprises specific steps of:

3.1) performing main pollutant RGB value extraction by: extracting the main pollutant RGB values in the pollutant images with an image processing software to form data with A rows and 3 columns, and writing the data into a txt file, wherein A rows refer to A groups of RGB values, and 3 columns refer to 3 values of RGB separated by commas; and 3.2) performing aberration calculation and pollutant identification by: presetting the aberration threshold, and calculating a difference between one of the cluster centers and the RGB data in the pollutant color gamut database; if the difference is smaller than the aberration threshold, regarding the cluster where the cluster center locates as a pollutant cluster; sequentially calculating differences between all the cluster centers and the RGB data in the pollutant color gamut database, thereby identifying B pollutant clusters which represent pollutants.

Preferably, the step 4) comprises specific steps of:

4.1) calculating the pollutant pixel area by: determining pollutant cluster identifiers according to the B pollutant clusters obtained in the step 3.2), traversing the k clusters obtained in the step 2.4), and regarding RGB identifiers which are same with the pollutant cluster identifiers as pollution; counting pollutant pixels to obtain the pollutant pixel area S';

4.2) calculating the actual pollutant area by: determining the two sets of the common point image pixel coordinates and the actual plane coordinates with a ruler tool of the image processing software; calculating the horizontal and vertical ratios between the actual plane coordinate system and the image pixel coordinate system with a following formula, so as to obtain the actual pollutant area S by multiplying the pollutant pixel area by the horizontal and vertical ratios;

$$Dx = \frac{|X2 - X1|}{|x2 - x1|}$$

$$Dy = \frac{|Y2 - Y1|}{|y2 - y1|}$$

wherein Dx and Dy represent the horizontal and vertical ratios between the actual plane coordinate system and the image pixel coordinate system respectively; x1, y1, x2, y2 are image pixel coordinates of a first common point and a second common point respectively; X1, Y1, X2, Y2 are image plane coordinates of the first common point and the second common point respectively; and 4.3) performing pollutant early warning by: judging whether the preset area threshold is exceeded according to the actual pollutant area calculated in the step 4.2); if so, issuing a warning for timely cleaning the pollutants.

The present invention also provides a system for pollutant identifying and early warning based on cluster analysis, comprising:

a pollutant image acquisition module, which is used to capture pollutant images in front of a sluice dam at certain intervals, and transmit the pollutant images captured by high-definition cameras to a computer;

an image processing and cluster analysis module, which is used to read image data, and convert the pollutant images from raster data to three-dimensional RGB data, and then convert the three-dimensional RGB data into two-dimensional image data in a form of row first and then column; wherein k cluster centers are determined according to a K-means analysis principle, and the two-dimensional image data is converted into k cluster RGB data through iterative calculation;

a pollutant identification module, which is used to extract main pollutant RGB values in the pollutant images, so as to form a pollutant color gamut database; wherein a difference between the k cluster RGB data and RGB data in the pollutant color gamut database is calculated, and an aberration threshold is set to identify pollutant clusters in k clusters; and a pollution area calculation and early warning module, which is used to determine a pixel quantity of the pollutant clusters according to K-means cluster analysis data identifiers, and calculate a pollutant pixel area; wherein horizontal and vertical ratios between an actual plane coordinate system and an image pixel coordinate system are calculated through two sets of common point image pixel coordinates and actual plane coordinates; an actual pollutant area is obtained by a product of the pollutant pixel area and the horizontal and vertical ratios; and whether a polluted area exceeds a critical value is judged according to a preset area threshold.

Preferably, the system further comprises:

a result display and data export module, which is used for result display and data export, wherein the result display comprises image display and data display; the image display provides original images captured by the high-definition cameras, processed images, and k cluster center display images; the data display provides RGB values of the k cluster centers, area proportions of the k clusters, pixel areas of the k clusters, and plane areas of the k clusters; data export outputs events involved in the data display.

According to the present invention, the method and system for pollutant identifying and early warning are based on cluster analysis, image recognition, and computer simulation technology, so as to provide an integrated system with low cost and no manual operation for pollutant real-time online monitoring and early warning. The present invention has beneficial effects as follows.

(1) The present invention provides the method and system for pollutant identifying and early warning based on the cluster analysis. A main purpose of which is to solve the problems of pollutant inspection in rivers or dams, such as high labor cost, long time consumption, and inability to determine the pollution degree. The above technical scheme can realize remote access to pollution data of rivers or sluice dams without supervision, thereby realizing all-weather early warning.

(2) Based on the principle of the cluster analysis, the present invention performs clustering on the pixels of the remote captured images for identifying the pollutants by comparing with the pollutant color gamut data, and converting the actual pollutant area by using the image common points, so as to perform the early warning based on the preset pollution area threshold.

(3) According to the present invention, the quantity of cameras is determined according to the width of the river or sluice dam, so as to perform pollutant monitoring and early warning for river or sluice dam with any width. By changing a k value of the cluster centers and the pollutant aberration threshold, recognition accuracy can be improved.

(4) The method provided by the present invention has a low degree of manual participation and a high degree of automation, which can identify any pollution in a complex environment. By updating the color gamut database, the method of the present invention can also perform monitoring, identification, and early warning in other aspects, such as water hyacinth and other floating aquatic plants warning, algal bloom warning, etc.

(5) The method provided by the present invention has been written into a program. All that needs to do is to write the pollutant color gamut and the coordinate data of the common point into a specified text file and start the program. It can quickly and accurately realize pollutant identifying and early warning in both manual and automatic conditions, which provides technical support for pollutant monitoring and early warning for rivers or sluice dams.

DETAILED DESCRIPTION OF THE PREFERRED EMBODIMENT

In order to make the technical solutions and advantages of the present invention clearer, the technical solutions of the present invention will be clearly and completely described below with reference to an embodiment and accompanying drawings. Obviously, the described embodiment is just part of all possible embodiments of the present invention. Based on the embodiment of the present invention, all other embodiments obtained by those of ordinary skill in the art without creative work shall fall within the protection scope of the present invention.

The present invention identifies and calculates a pollutant area by acquiring high-definition images in front of a sluice dam, performing cluster analysis, combining a pollutant color gamut database, and setting an aberration threshold. By comparing with a preset pollutant area threshold, pollutant early warning can be performed.

Referring to the embodiment and the drawings, the present invention will be further illustrated below.

Figure 1:
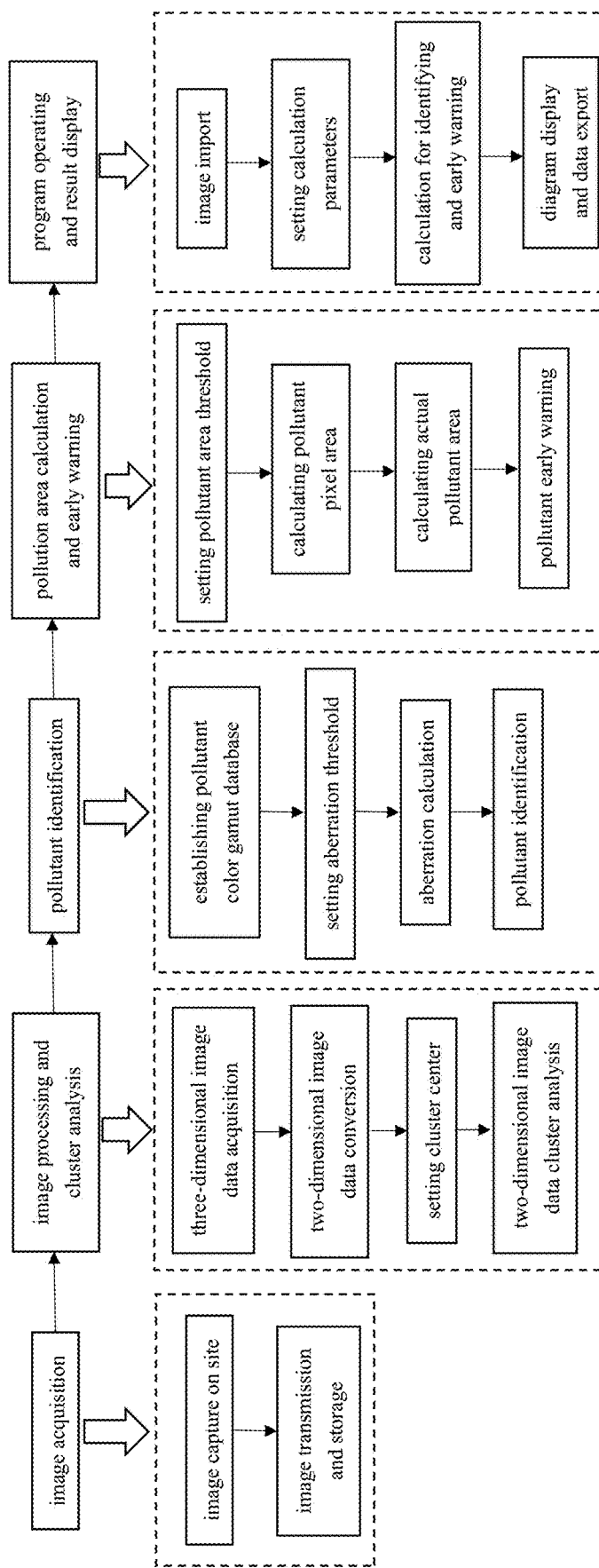
FIG. 1 is a flow chart of a method for pollutant identifying and early warning based on cluster analysis according to an embodiment of the present invention.
Figure 2:
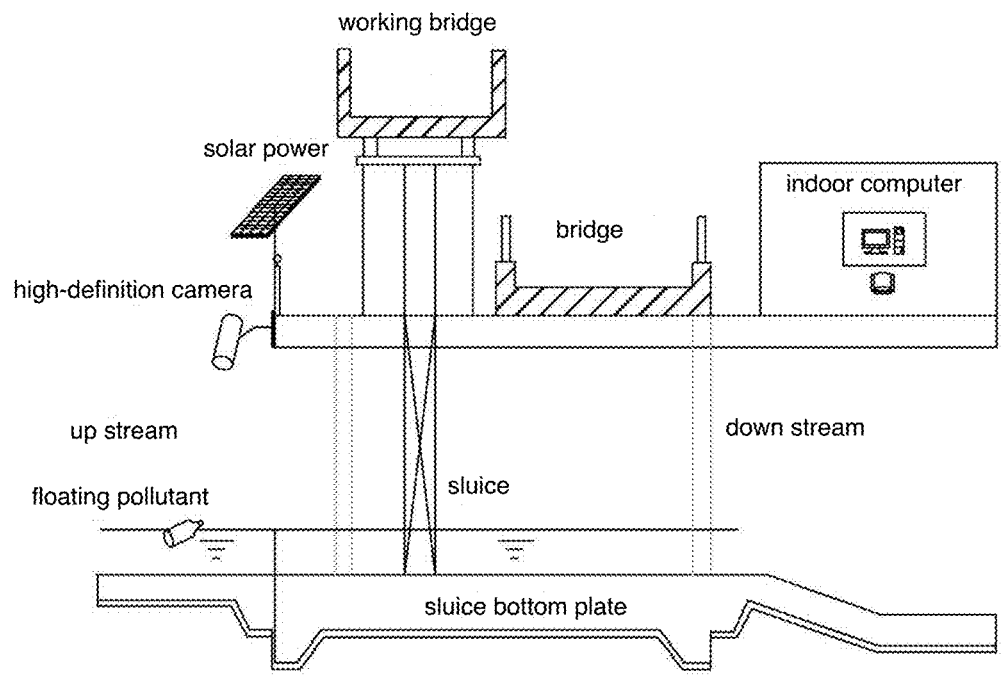
FIG. 2 is a structural diagram of a system for pollutant identifying and early warning based on cluster analysis according to the present invention.
Figure 3:
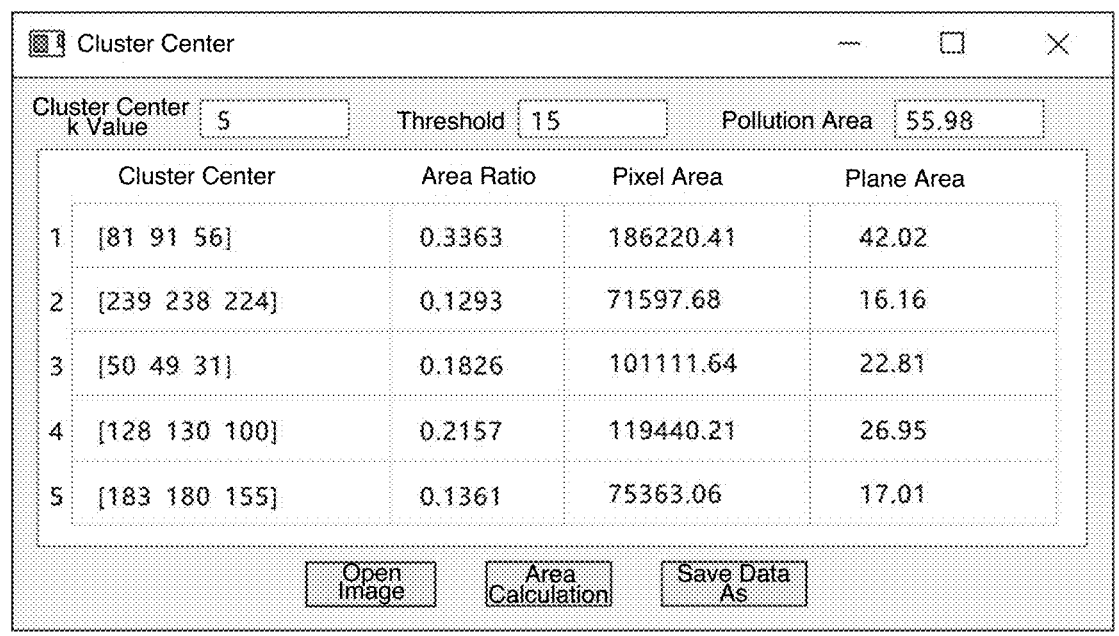
FIG. 3 is a main interface of calculation and parameter setting of the system for the pollutant identifying and the early warning based on the cluster analysis according to the present invention.
Figure 5:
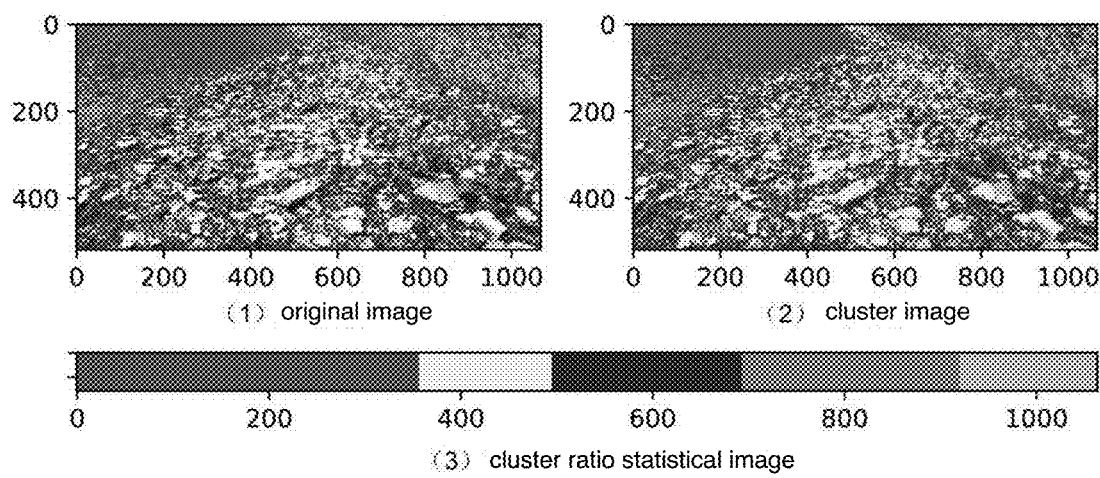
FIG. 5 illustrates an original image, a cluster image, and a cluster ratio statistical image according to the embodiment of the present invention.

Referring to FIG. 1, the embodiment of the present invention provides a method for pollutant identifying and early warning based on cluster analysis, comprising steps of:

1) performing pollutant image acquisition:
   1.1) performing image capture by: setting a set of high-definition cameras on a sluice with a shooting angle of about 45°; and capturing pollutant images once every 24 hours (i.e. every 9:00 am), wherein system design and components are shown in FIG. 2; and
   1.2) performing image transmission and storage: transmitting the pollutant images to an indoor computer through a wireless transmission module of the cameras, and storing in a "F:\imagedata" folder;

2) performing image processing and cluster analysis:
   2.1) performing three-dimensional image data acquisition by: reading images of the day in the "F:\imagedata" folder through Python to obtain M×N×3 three-dimensional tuple data (according to the embodiment, M=1067, N=519);
   2.2) performing two-dimensional image data conversion by: using array and reshape in a data processing tool Numpy to convert the M×N×3 three-dimensional tuple data into two-dimensional image data in a form of MN×3 in an order from left to right and from top to bottom (according to the embodiment, MN=553773);
   2.3) performing cluster calculation and iteration by: setting a cluster center k value to 5, and using KMeans in a Python machine learning tool sklearn.cluster to perform cluster analysis on the two-dimensional data MN×3, so as to obtain five cluster center RGB values and pixel cluster identifiers; and 2.4) performing image pixel cluster by: using concatenate in Numpy to combine the two-dimensional data MN×3 and the pixel cluster identifier into two-dimensional data MN×4; making an order of the cluster center RGB values (0, 1, 2, 3, 4) consistent with the pixel cluster identifier, thus traversing the two-dimensional data MN×4; replacing RGB data in MN×4, whose identifier is consistent with cluster center RGB value identifier, with the cluster center RGB value to complete the image pixel cluster;

3) performing pollutant identification:

3.1) performing main pollutant RGB value extraction by: establishing a pollutant color gamut database when using this method for the first time; extracting the main pollutant RGB values in the pollutant images with photoshop to form data with A rows (according to the embodiment, A=2) and 3 columns, and writing the data into a txt file, wherein A rows refer to A groups of RGB values, and 3 columns refer to 3 values of RGB separated by commas; wherein this database can be established in advance, and the corresponding RGB values can be added or deleted according to the type or color of pollutants, to update the color library; and 3.2) performing aberration calculation and pollutant identification by: presetting the aberration threshold to 15, and sequentially calculating differences between all the cluster centers and the RGB data in the pollutant color gamut database; if the difference is smaller than the aberration threshold, regarding the cluster where the cluster center locates as a pollutant cluster;

4) performing pollution area calculation and early warning:

4.1) according to the identified pollutant cluster, defining pollutant cluster identifiers as 1, 2 and 4; traversing 5 clusters to obtain the pollutant pixel area S'=248072.4 (dimensionless) through statistic;

4.2) importing the images into photoshop, using the ruler tool to determine two sets of common points with pixel coordinates of (0, 400) and (1000, 200), and plane coordinates of (575634.32, 3532452.26) and (575642.63, 3532457.69); calculating horizontal and vertical ratios between the plane coordinate system and the image pixel coordinate system, so as to obtain an actual pollutant area S=55.98m$^2$; and 4.3) setting a pollutant area threshold value to 50 m$^2$, wherein the actual pollutant area is larger than the threshold value, so the indoor computer issues a warning to remind relevant departments to clean up the pollutants in time; and 5) performing result display and data export;

wherein as shown in FIG. 5, image display provides original images captured by the high-definition cameras, processed images, and k cluster center display images; as shown in FIG. 3, the data display provides RGB values of the k cluster centers, area proportions of the k clusters, pixel areas of the k clusters, and plane areas of the k clusters; data export outputs events involved in the data display.

Figure 4:
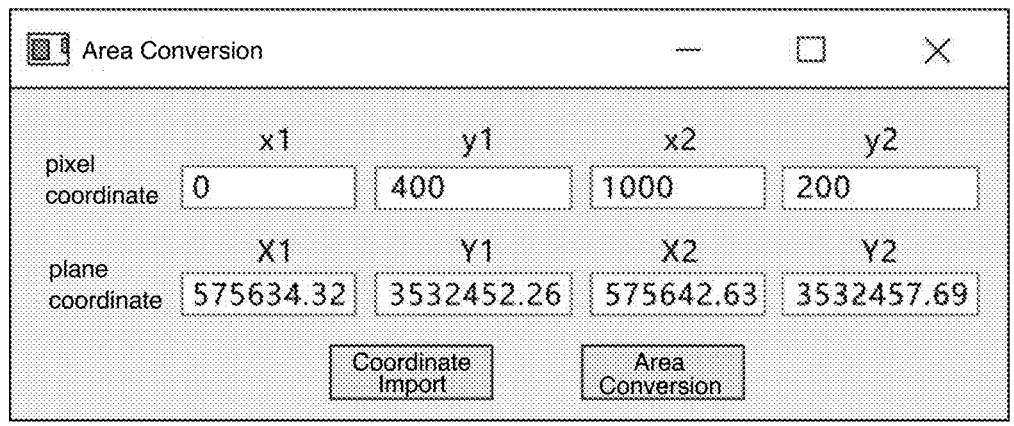
FIG. 4 is a pollution area conversion interface of the system for the pollutant identifying and the early warning based on the cluster analysis according to the present invention.

According to the calculation concept of the above steps 1) to 5), Python can be used to write programs for data calculation, display and export because of the large amount of calculation. Such program can realize automatic early warning without manual supervision or operation. In order to show the calculation concept of each step, the program is modified into a human-computer interactive program, comprising the following operation steps of:

1) preparing basic data: wherein the basic data comprises pollutant color gamut data and common point data; (1) the pollutant color gamut data: the data are recorded in a text file (with a txt extension), content of the file is RGB data with N lines and 3 columns, and a storage path is the same as the image storage path (F:\image-data); (2) common point data: There are 2 sets of common point data, each set contains image pixel coordinates and actual plane coordinates, which can be manually input or imported through a file; a file format is N lines and 4 columns; the first and second columns are the image pixel coordinates, and the third and fourth columns are the actual plane coordinates; N represents the number of common points; in the embodiment, the pixel coordinates are (0, 400) and (1000, 200), and the actual plane coordinates are (575634.32, 3532452.26) and (575642.63, 3532457.69);

2) operating: (1) running the program: opening a main interface of the program (as shown in FIG. 3), entering 5 in "Cluster Center k Value" box, and then clicking "Open Image" button to select a recent image from a dialog box; wherein image cluster analysis is performed in the background; after calculation, results of "Cluster Center" and "Area Ratio" are automatically written into the first and second columns of the table; the original image, the cluster image and the cluster ratio statistical image are displayed (as shown in FIG. 5); (2) filling in the aberration threshold value of 15 in "Threshold", then clicking an "Area Calculation" button; filling in or importing the coordinates of the common points in a pop-up "Area Conversion" interface (as shown in FIG. 4), and then clicking "Area Conversion" to call the pollutant color gamut data and common point coordinate data for aberration calculation, pollutant identification and area conversion; wherein calculation results are automatically displayed in the third and fourth columns of the main interface table and a pollution area text box (as shown in FIG. 3); (3) after area calculation, clicking "Save Data As", selecting file storage path and file name in the dialog box, and clicking "Save" to store the results (data in the table).

The embodiment of present invention also provides a system for pollutant identifying and early warning based on cluster analysis, comprising:

a pollutant image acquisition module, which is used to capture pollutant images in front of a sluice dam at certain intervals, and transmit the pollutant images captured by high-definition cameras to a computer;

an image processing and cluster analysis module, which is used to read image data, and convert the pollutant images from raster data to three-dimensional RGB data, and then convert the three-dimensional RGB data into two-dimensional image data in a form of row first and then column; wherein k cluster centers are determined according to a K-means analysis principle, and the two-dimensional image data is converted into k cluster RGB data through iterative calculation;

a pollutant identification module, which is used to extract main pollutant RGB values in the pollutant images, so as to form a pollutant color gamut database; wherein a difference between the k cluster RGB data and RGB data in the pollutant color gamut database is calculated, and an aberration threshold is set to identify pollutant clusters in k clusters;

a pollution area calculation and early warning module, which is used to determine a pixel quantity of the pollutant clusters according to K-means cluster analysis data identifiers, and calculate a pollutant pixel area; wherein horizontal and vertical ratios between an actual plane coordinate system and an image pixel coordinate system are calculated through two sets of common point image pixel coordinates and actual plane coordinates; an actual pollutant area is obtained by a product of the pollutant pixel area and the horizontal and vertical ratios; and whether a polluted area exceeds a critical value is judged according to a preset area threshold; and a result display and data export module, which is used for result display and data export, wherein the result display comprises image display and data display; the image display provides original images captured by the high-definition cameras, processed images, and k cluster center display images; the data display provides RGB values of the k cluster centers, area proportions of the k clusters, pixel areas of the k clusters, and plane areas of the k clusters; data export outputs events involved in the data display.

Compared with the conventional inspection method, the pollutant identifying and early warning technology of the present invention is real-time online, fully automatic, unattended, and quantitative in pollutant monitoring and early warning. Furthermore, the related technologies have been written into programs for practical application.

The above descriptions are only the embodiment of the present invention but are not intended to be limiting Those skilled in the art can easily think of modifications or substitutions within the technical scope disclosed by the present invention, and such modifications and substitutions should be included within the protection scope of the present invention. Therefore, the protection scope of the present invention should be subject to the following claims.

What is claimed is:

1. A method for pollutant identifying and early warning based on cluster analysis, comprising steps of:
   1) performing pollutant image acquisition by: installing multiple high-definition cameras on a river or a sluice dam, capturing pollutant images in front of the sluice dam at certain intervals, and transmitting the pollutant images captured by the high-definition cameras to a computer;
   2) performing image processing and cluster analysis by: reading image data by the computer, and converting the pollutant images from raster data to three-dimensional RGB data; then converting the three-dimensional RGB data into two-dimensional image data in a form of row first and then column; determining k cluster centers according to a K-means analysis principle, and converting the two-dimensional image data into k cluster RGB data through iterative calculation;
   3) performing pollutant identification by: extracting main pollutant RGB values in the pollutant images, so as to form a pollutant color gamut database; calculating a difference between the k cluster RGB data and RGB data in the pollutant color gamut database, and setting an aberration threshold to identify pollutant clusters in k clusters; and
   4) performing pollution area calculation and early warning by: determining a pixel quantity of the pollutant clusters according to K-means cluster analysis data identifiers, and calculating a pollutant pixel area; then calculating horizontal and vertical ratios between an actual plane coordinate system and an image pixel coordinate system through two sets of common point image pixel coordinates and actual plane coordinates; obtaining an actual pollutant area by a product of the pollutant pixel area and the horizontal and vertical ratios; and judging whether a polluted area exceeds a critical value according to a preset area threshold.

2. The method, as recited in claim 1, further comprising a step of:
   5) performing result display and data export, wherein the result display comprises image display and data display; the image display provides original images captured by the high-definition cameras, processed images, and k cluster center display images; the data display provides RGB values of the k cluster centers, area proportions of the k clusters, pixel areas of the k clusters, and plane areas of the k clusters; data export outputs events involved in the data display.

3. The method, as recited in claim 1, wherein the step 1) comprises specific steps of:
   1.1) performing image capture by: setting the high-definition cameras on the river or the sluice dam, and automatically capturing the pollutant images in front of the sluice dam at the certain intervals; and
   1.2) performing image transmission and storage: transmitting the pollutant images to an indoor computer through a wireless transmission module, and storing in a designated folder.

4. The method, as recited in claim 3, wherein the step 2) comprises specific steps of:
   2.1) performing three-dimensional image data acquisition by: reading a recent image to obtain three-dimensional image data thereof in a form of M×N×3, wherein the form of M×N×3 refers to RGB triads with M rows and N columns;
   2.2) performing two-dimensional image data conversion by: rearranging the three-dimensional image data to convert the three-dimensional image data into the two-dimensional image data in a form of MN×3 in an order from left to right and from top to bottom, wherein the form of MN×3 refers to MN rows and 3 columns; MN represents a product of M and N, 3 columns represent RGB triads;
   2.3) performing cluster calculation by: dividing the two-dimensional image data into k groups, and randomly selecting k objects as initial cluster centers; calculating distances between each object and each cluster center, and assigning each object to a nearest cluster center according to a distance calculation result, thereby forming the k clusters and completing one cluster calculation; and
   2.4) performing cluster iteration by: continuously updating the cluster centers through the cluster calculation; iterating by repeating the step 2.3) until the cluster centers no longer change, thereby completing the cluster iteration and determining the k clusters as well as the k cluster centers; and numbering RGB values of the clusters and the cluster centers for identification.

5. The method, as recited in claim 4, wherein the step 3) comprises specific steps of:
   3.1) performing main pollutant RGB value extraction by: extracting the main pollutant RGB values in the pollutant images with an image processing software to form data with A rows and 3 columns, and writing the data into a txt file, wherein A rows refer to A groups of RGB values, and 3 columns refer to 3 values of RGB separated by commas; and
   3.2) performing aberration calculation and pollutant identification by: presetting the aberration threshold, and calculating a difference between one of the cluster centers and the RGB data in the pollutant color gamut database; if the difference is smaller than the aberration threshold, regarding the cluster where the cluster center locates as a pollutant cluster; sequentially calculating differences between all the cluster centers and the RGB data in the pollutant color gamut database, thereby identifying B pollutant clusters which represent pollutants.

6. The method, as recited in claim 5, wherein the step 4) comprises specific steps of:

4.1) calculating the pollutant pixel area by: determining pollutant cluster identifiers according to the B pollutant clusters obtained in the step 3.2), traversing the k clusters obtained in the step 2.4), and regarding RGB identifiers which are same with the pollutant cluster identifiers as pollution; counting pollutant pixels to obtain the pollutant pixel area S';

4.2) calculating the actual pollutant area by: determining the two sets of the common point image pixel coordinates and the actual plane coordinates with a ruler tool of the image processing software; calculating the horizontal and vertical ratios between the actual plane coordinate system and the image pixel coordinate system with a following formula, so as to obtain the actual pollutant area S by multiplying the pollutant pixel area by the horizontal and vertical ratios;

$$Dx = \frac{|X2 - X1|}{|x2 - x1|}$$

$$Dy = \frac{|Y2 - Y1|}{|y2 - y1|}$$

wherein Dx and Dy represent the horizontal and vertical ratios between the actual plane coordinate system and the image pixel coordinate system respectively; x1, y1, x2, y2 are image pixel coordinates of a first common point and a second common point respectively; X1, Y1, X2, Y2 are image plane coordinates of the first common point and the second common point respectively; and 4.3) performing pollutant early warning by: judging whether the preset area threshold is exceeded according to the actual pollutant area calculated in the step 4.2); if so, issuing a warning for timely cleaning the pollutants.

7. A system for pollutant identifying and early warning based on cluster analysis, comprising:

a pollutant image acquisition module, which is used to capture pollutant images in front of a sluice dam at certain intervals, and transmit the pollutant images captured by high-definition cameras to a computer;

an image processing and cluster analysis module, which is used to read image data, and convert the pollutant images from raster data to three-dimensional RGB data, and then convert the three-dimensional RGB data into two-dimensional image data in a form of row first and then column; wherein k cluster centers are determined according to a K-means analysis principle, and the two-dimensional image data is converted into k cluster RGB data through iterative calculation;

a pollutant identification module, which is used to extract main pollutant RGB values in the pollutant images, so as to form a pollutant color gamut database; wherein a difference between the k cluster RGB data and RGB data in the pollutant color gamut database is calculated, and an aberration threshold is set to identify pollutant clusters in k clusters; and a pollution area calculation and early warning module, which is used to determine a pixel quantity of the pollutant clusters according to K-means cluster analysis data identifiers, and calculate a pollutant pixel area; wherein horizontal and vertical ratios between an actual plane coordinate system and an image pixel coordinate system are calculated through two sets of common point image pixel coordinates and actual plane coordinates; an actual pollutant area is obtained by a product of the pollutant pixel area and the horizontal and vertical ratios; and whether a polluted area exceeds a critical value is judged according to a preset area threshold.

8. The system, as recited in claim 7, further comprising:

a result display and data export module, which is used for result display and data export, wherein the result display comprises image display and data display; the image display provides original images captured by the high-definition cameras, processed images, and k cluster center display images; the data display provides RGB values of the k cluster centers, area proportions of the k clusters, pixel areas of the k clusters, and plane areas of the k clusters; data export outputs events involved in the data display.

* * * * *